（12）United States Patent
Ahn et al.

(10) Patent No.: US 9,373,022 B2
(45) Date of Patent: *Jun. 21, 2016

(54) IMAGE PROCESSING APPARATUS, METHOD OF PROCESSING IMAGE, AND COMPUTER-READABLE STORAGE MEDIUM

(71) Applicant: SAMSUNG ELECTRONICS CO., LTD., Suwon-si, Gyeonggi-do (KR)

(72) Inventors: Seon-ju Ahn, Yongin-si (KR); Sang-ryong Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/801,386

(22) Filed: Jul. 16, 2015

(65) Prior Publication Data
US 2015/0325025 A1    Nov. 12, 2015

Related U.S. Application Data

(63) Continuation of application No. 14/721,496, filed on May 26, 2015, which is a continuation of application No. 13/562,803, filed on Jul. 31, 2012, now Pat. No. 9,064,348.

(30) Foreign Application Priority Data

Aug. 11, 2011    (KR) ................ 10-2011-0080188

(51) Int. Cl.
G06K 9/46    (2006.01)
G06K 9/66    (2006.01)
G06K 9/00    (2006.01)
(Continued)

(52) U.S. Cl.
CPC ........ *G06K 9/00228* (2013.01); *G06K 9/00241* (2013.01); *G06K 9/00275* (2013.01); *G06T 3/40* (2013.01); *G06T 11/60* (2013.01); *H04N 5/23219* (2013.01); *G06T 2207/30201* (2013.01); *G06T 2210/22* (2013.01)

(58) Field of Classification Search
CPC . G06T 11/60; G06T 2210/22; G06K 9/00228
See application file for complete search history.

(56) References Cited

U.S. PATENT DOCUMENTS 7,912,254 B2 *  3/2011  Tsuji ................. G06K 9/00228
                                                    382/118
7,929,042 B2    4/2011  Terashima
(Continued)

FOREIGN PATENT DOCUMENTS

JP    2007-272318 A    10/2007
JP    2008-061114 A    3/2008
(Continued)

OTHER PUBLICATIONS

Search Report issued for GB 1213836.8 (Dec. 24, 2012).

*Primary Examiner* — Gregory M Desire
(74) *Attorney, Agent, or Firm* — Drinker Biddle & Reath LLP

(57) ABSTRACT

A method of processing an image involves detecting a face from a first image; determining a composition of the first image; selecting a composition of a second image according to the composition of the first image; and generating the second image including the face by trimming the first image, according to the composition of the second image.

4 Claims, 14 Drawing Sheets

(51) Int. Cl.
 *G06T 11/60* (2006.01)
 *H04N 5/232* (2006.01)
 *G06T 3/40* (2006.01)

(56) References Cited

U.S. PATENT DOCUMENTS

| | | | |
|---|---|---|---|
| 8,144,235 | B2 | 3/2012 | Mori |
| 8,265,423 | B2 | 9/2012 | Fukuda |
| 8,446,479 | B2* | 5/2013 | Uemura ............. G06K 9/00228 348/220.1 |
| 8,471,944 | B2 | 6/2013 | Nonaka et al. |
| 8,565,496 | B2* | 10/2013 | Sanno ................... G06T 11/60 348/231.6 |
| 8,698,920 | B2 | 4/2014 | Uemura et al. |
| 8,743,269 | B2* | 6/2014 | Kunishige ............. H04N 5/232 348/333.11 |
| 8,971,662 | B2* | 3/2015 | Fukata ......................... 382/282 |
| 2005/0196069 | A1* | 9/2005 | Yonaha ................ H04N 1/3872 382/282 |
| 2007/0236762 | A1 | 10/2007 | Tsuji |
| 2007/0237421 | A1 | 10/2007 | Luo et al. |
| 2008/0025558 | A1* | 1/2008 | Nozawa ................ H04N 1/3875 382/100 |
| 2008/0218603 | A1 | 9/2008 | Oishi |
| 2010/0073506 | A1 | 3/2010 | Uehara et al. |
| 2010/0195912 | A1 | 8/2010 | Nakada et al. |
| 2011/0043651 | A1* | 2/2011 | Nonaka .............. H04N 5/23219 348/220.1 |
| 2011/0187882 | A1 | 8/2011 | Kim et al. |
| 2012/0307101 | A1* | 12/2012 | Fukuya ............. H04N 5/23216 348/222.1 |

FOREIGN PATENT DOCUMENTS

| | | |
|---|---|---|
| JP | 2008-219451 A | 9/2008 |
| KR | 1020090081141 A | 7/2009 |

* cited by examiner

IMG 101

IMG 211

IMG 212

IMG 102

IMG 221

IMG 222

IMAGE PROCESSING APPARATUS, METHOD OF PROCESSING IMAGE, AND COMPUTER-READABLE STORAGE MEDIUM

CROSS-REFERENCE TO RELATED PATENT APPLICATIONS

This application is a continuation of U.S. patent application Ser. No. 14/721,496, filed May 26, 2015, which is a continuation of U.S. patent application Ser. No. 13/562,803, filed Jul. 31, 2012, now U.S. Pat. No. 9,064,348, which claims the benefit of Korean Patent Application No. 10-2011-0080188, filed on Aug. 11, 2011, in the Korean Intellectual Property Office, the disclosures of which are incorporated herein in their entirety by reference.

BACKGROUND

1. Field

The invention relates to an image processing apparatus, a method of processing an image, and a computer-readable storage medium for executing the method.

2. Description of the Related Art

Often image processing apparatuses include a face detection function which may provide a user with functions and information regarding detected faces in captured images. Additionally, some digital image-capturing apparatuses include functions to display a position of a detected face, and functions to automatically focus based on a detected face. But, despite the functionality included in some digital image-capturing apparatuses, the user may not be pleased with the quality of the captured image because the face or faces in the image may not be of a high enough quality to satisfy the user.

SUMMARY

Therefore, there is a need in the art for an apparatus, computer readable medium, and method for processing images, the method including detecting a face from a first image; determining a composition of the first image; selecting a composition of a second image according to the composition of the first image; and generating the second image including the face by trimming the first image, according to the composition of the second image. The method may further include operations of storing the first image; and storing the second image.

The operation of determining the composition may include an operation of determining the composition of the first image based on a position of the face, a size of the face, the number of faces, or an aspect ratio of the first image.

The method may further include an operation of determining whether a trimming operation can be performed, according to detection information regarding the face or the composition of the first image, and the operation of selecting the composition and the operation of generating the second image may be performed only when the trimming operation can be performed according to a result of the operation of determining.

The operation of determining the trimming operation may include an operation of determining that the trimming operation cannot be performed if a plurality of faces is detected from the first image, if a face is not detected from the first image, or if a size of the face is greater than a reference value.

If a plurality of faces are detected from the first image, the method may further include an operation of selecting faces to be included in the second image based on a size of each of the plurality of faces or a distance between the plurality of faces, and the operation of selecting the composition may include an operation of selecting the composition of the second image based on the size of each of the plurality of faces or the distance between the plurality of faces.

If the plurality of faces are detected from the first image, the operation of generating the second image may include an operation of generating the second image by separately trimming each of the plurality of faces, or may include an operation of generating the second image by performing a trimming operation to include two or more faces from among the plurality of faces.

The method may further include an operation of performing a post-processing operation for adjusting the clearness of a face and the clearness of a background in the second image according to the composition of the first image.

The method may further include an operation of editing the composition of the second image according to a user input.

The method may further include an operation of storing relation information indicating that the first image and the second image include the same face.

According to another aspect of the invention, there is provided an image processing apparatus including a face detecting unit for detecting a face from a first image; a composition determining unit for determining a composition of the first image; a composition selecting unit for selecting a composition of a second image according to the composition of the first image; and an image generating unit for generating the second image including the face by trimming the first image, according to the composition of the second image.

The image processing apparatus may further include a data storage unit for storing the first image and the second image.

The composition determining unit may determine the composition of the first image based on a position of the face, a size of the face, the number of faces, or an aspect ratio of the first image.

The image processing apparatus may further include a trimming condition determining unit for determining whether a trimming operation can be performed, according to detection information regarding the face or the composition of the first image, and the image generating unit may generate the second image only when the trimming condition determining unit determines that the trimming operation can be performed.

The trimming condition determining unit may determine that the trimming operation cannot be performed if a plurality of faces are detected from the first image, if a face is not detected from the first image, or if a size of the face is greater than a reference value.

If a plurality of faces are detected from the first image, the composition selecting unit may select faces to be included in the second image and the composition of the second image, based on a size of each of the plurality of faces or a distance between the plurality of faces.

If the plurality of faces are detected from the first image, the image generating unit may generate the second image by separately trimming each of the plurality of faces, or may generate the second image by performing a trimming operation so as to include two or more faces from among the plurality of faces.

The image processing apparatus may further include a post-processing unit for adjusting the clearness of a face and the clearness of a background in the second image according to the composition of the first image.

The image processing apparatus may further include a composition editing unit for editing the composition of the second image according to a user input.

The data storage unit may store relation information indicating that the first image and the second image include the same face.

According to another aspect of the invention, there is provided a computer-readable storage medium for storing computer program codes for executing a method of processing an image, the method including operations of detecting a face from a first image; determining a composition of the first image; selecting a composition of a second image according to the composition of the first image; and generating the second image including the face by trimming the first image, according to the composition of the second image.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

The following description and drawings are provided to give a sufficient understanding of embodiments of the invention. Functions or constructions that are well-known to one of ordinary skill in the art may be omitted.

Hereinafter, the invention will be described in detail by explaining example embodiments of the invention with reference to the attached drawings.

As used herein, the term "and/or" includes any and all combinations of one or more of the associated listed items.

Figure 1:
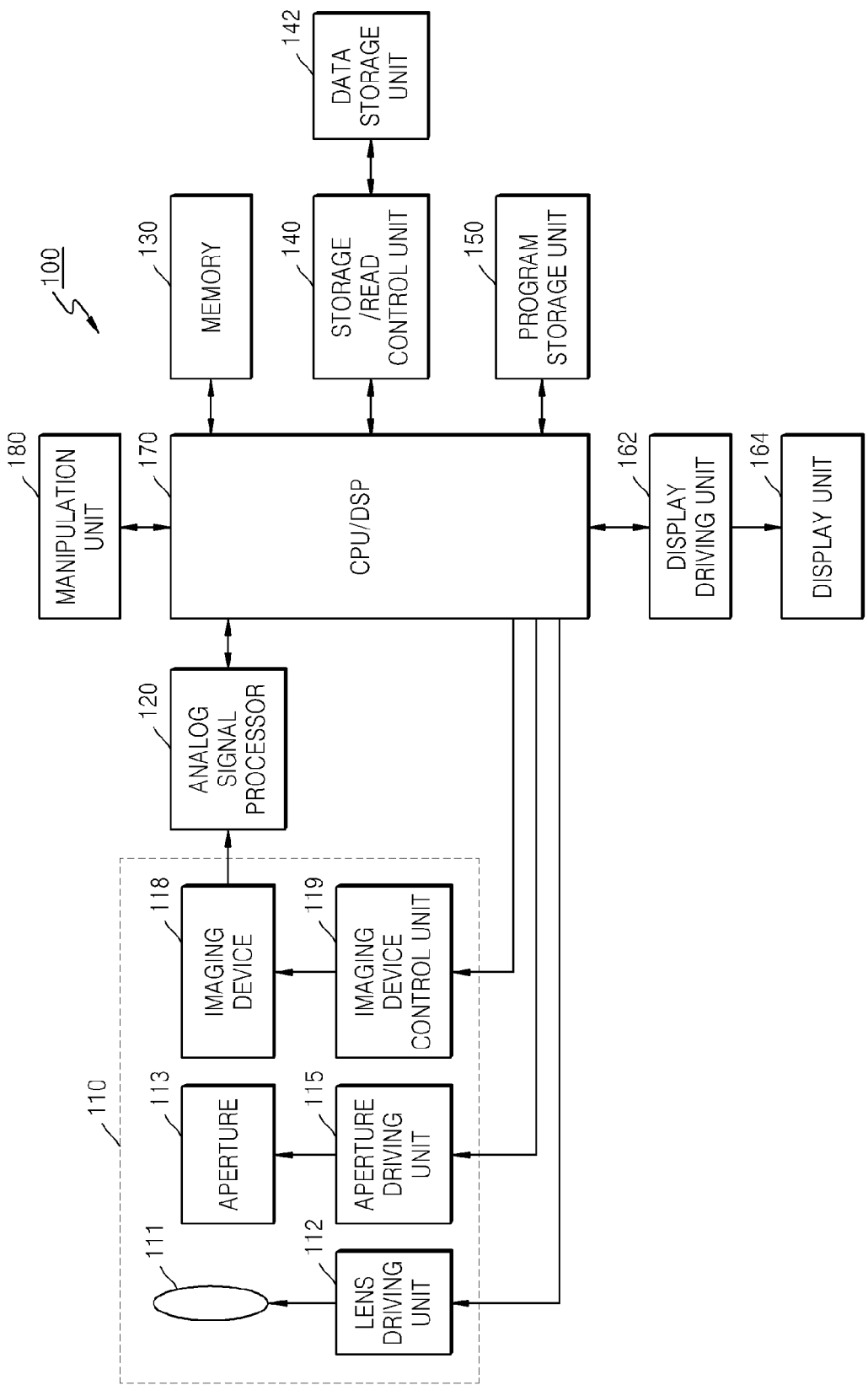
FIG. 1 is a block diagram illustrating of a structure of a digital image-capturing apparatus that is an example of an embodiment of the invention.

FIG. 1 is a block diagram illustrating of a structure of a digital image-capturing apparatus 100 that is an example of an embodiment of the invention. The digital image-capturing apparatus 100 may include an image-capturing unit 110, an analog signal processor 120, a memory 130, a storage/read control unit 140, a data storage unit 142, a program storage unit 150, a display driving unit 162, a central processing unit/digital signal processor (CPU/DSP) 170, and a manipulation unit 180.

Operations of the digital image-capturing apparatus 100 are controlled by the CPU/DSP 170. The CPU/DSP 170 provides a lens driving unit 112, an aperture driving unit 115, and an imaging device control unit 119 with control signals for operations of configuring elements.

The image-capturing unit 110 includes a lens 111, the lens driving unit 112, an aperture 113, the aperture driving unit 115, an imaging device 118, and the imaging device control unit 119 as configuring elements for generating an image of an electrical signal from incident light.

The lens 111 may include groups of lenses or a plurality of lenses. A position of the lens 111 is adjusted by the lens driving unit 112. The lens driving unit 112 adjusts the position of the lens 111 according to a control signal provided from the CPU/DSP 170.

A degree of opening and closing the aperture 113 is adjusted by the aperture driving unit 115, and the aperture 113 adjusts the amount of light incident on the imaging device 118.

An optical signal that has passed through the lens 111 and the aperture 113 reaches a light-receiving surface of the imaging device 118 and then forms an image of a target object. The imaging device 118 may be a Charge-Coupled Device (CCD) image sensor or a Complementary Metal-Oxide Semiconductor Image Sensor (CIS), which converts the optical signal into an electrical signal. Sensitivity (e.g. ISO value) or the like of the imaging device 118 may be adjusted by the imaging device control unit 119. The imaging device control unit 119 may control the imaging device 118 according to a control signal that is automatically generated based on an image signal that is input in real-time, or according to a control signal that is manually input via user manipulation.

An exposure time of the imaging device 118 is adjusted by a shutter (not shown). The shutter is classified into a mechanical shutter and an electronic shutter, wherein the mechanical shutter adjusts the incidence of light by moving a screen and the electronic shutter controls an exposure by supplying an electrical signal to the imaging device 118.

The analog signal processor 120 performs noise reduction, gain adjustment, waveform shaping, analog-to-digital conversion processing, or the like on an analog signal supplied from the imaging device 118.

The analog signal processed by the analog signal processor 120 may be input to the CPU/DSP 170 via the memory 130 or may be directly input to the CPU/DSP 170 without passing the memory 130. Here, the memory 130 operates as a main memory of the digital image-capturing apparatus 100 and temporarily stores information for the CPU/DSP 170 to operate. The program storage unit 150 stores programs including an operating system, an application system, and the like that drive the digital image-capturing apparatus 100.

In addition, the digital image-capturing apparatus 100 includes a display unit 164 to display an operational state of the digital image-capturing apparatus 100 or to display information regarding an image captured by the digital image-capturing apparatus 100. The display unit 164 may provide a user with visual information and/or acoustic information. In order to provide the visual information, the display unit 164 may include a liquid crystal display (LCD) panel, an organic light-emitting diode display panel, or the like. Also, the display unit 164 may include a touch screen capable of recognizing a touch input.

The display driving unit 162 provides a driving signal to the display unit 164.

The CPU/DSP 170 processes an input image signal and controls each configuring unit according to the input image signal or an external input signal. The CPU/DSP 170 may perform image signal processing, including noise reduction, gamma correction, color filter array interpolation, color matrix, color correction, color enhancement and the like, on input image data so as to improve image quality. Also, the CPU/DSP 170 may generate an image file by compressing image data that is generated by the image signal processing to improve image quality or may restore image data from the image file. An image compression format may be reversible or irreversible. In a case of a still image, examples of the image compression format include a Joint Photographic Experts Group (JPEG) format, a JPEG 2000 format, and the like. In a case where a moving picture is recorded, a moving picture file may be generated by compressing a plurality of compositions according to the Moving Picture Experts Group (MPEG) standard. The image file may be generated according to the Exchangeable image file format (Exif) standard.

The image data output from the CPU/DSP 170 is input to the storage/read control unit 140 via the memory 130 or is directly input to the storage/read control unit 140, and in this regard, the storage/read control unit 140 stores the image data in the data storage unit 142 according to a user signal or automatically stores the image data in the data storage unit 142. Also, the storage/read control unit 140 may read data regarding an image from an image file stored in the data storage unit 142 and may allow the image to be displayed on the display unit 164 by inputting the data to the display driving unit 162 via the memory 130 or via another path. The data storage unit 142 may be detachable or may be permanently mounted in the digital image-capturing apparatus 100.

Also, the CPU/DSP 170 may perform unclearness processing, color processing, blur processing, edge emphasis processing, image analysis processing, image recognition processing, image effect processing, or the like. The image recognition processing may include face recognition processing, scene recognition processing, and the like. In addition, the CPU/DSP 170 may perform display image signal processing to display the image on the display unit 164. For example, the CPU/DSP 170 may perform brightness level adjustment, color correction, contrast adjustment, outline emphasis adjustment, screen division processing, character image generation, image synthesis processing, or the like. The CPU/DSP 170 may be connected to an external monitor, may perform predetermined image signal processing, and then may transmit processed image data to allow a corresponding image to be displayed on the external monitor.

Also, the CPU/DSP 170 may generate a control signal by executing a program stored in the program storage unit 150 or by including a separate module to control auto-focusing, a zoom change, a focus change, auto-exposure correction, or the like, so that the CPU/DSP 170 may provide the control signal to the aperture driving unit 115, the lens driving unit 112, and the imaging device control unit 119 and may collectively control operations of configuring elements included in the digital image-capturing apparatus 100.

The manipulation unit 180 is a unit via which a user may input a control signal. The manipulation unit 180 may include various function buttons such as a shutter-release button for inputting a shutter-release signal to allow an image to be captured by exposing the imaging device 118 to light during a predetermined time period, a power button for inputting a control signal to control power on or off, a zoom button for widening and narrowing an angle of view according to an input, a mode selection button, an image-capturing setting value adjustment button, or the like. The manipulation unit 180 may be embodied as one of various forms including buttons, a keyboard, a touchpad, a touchscreen, a remote controller, and the like via which a user may input a control signal.

The digital image-capturing apparatus 100 of FIG. 1 is an example of the image processing apparatus according to a current embodiment. However, the image processing apparatus is not limited to the digital image-capturing apparatus 100. That is, the image processing apparatus according to the embodiment may be applied not only to the digital image-capturing apparatus 100 but may also be applied to a personal digital assistant (PDA), a mobile phone, a computer, or the like, which may capture an image, may store the image, and may reproduce images stored in a storage medium. Also, a configuration of the digital image-capturing apparatus 100 is not limited to what is shown in FIG. 1. For convenience of description, the current embodiment and other embodiments to follow are described with reference to the digital image-capturing apparatus 100 but the current embodiment and other embodiments according to the invention are not limited thereto.

Figure 2:
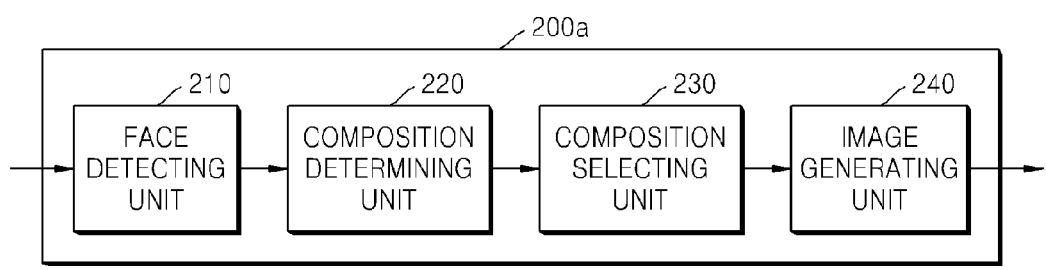
FIG. 2 is a diagram of an example of an image processing apparatus according to an embodiment of the invention.

FIG. 2 is a diagram of an example of an image processing apparatus 200a according to an embodiment of the invention. The image processing apparatus 200a of FIG. 2 may be a part of the digital image-capturing apparatus 100 of FIG. 1 or may be a part of a PDA, a mobile phone, or a computer. For example, configuring elements shown in FIG. 2 may be a part of the CPU/DSP 170 of FIG. 1. Although not illustrated in FIG. 1, the configuring elements shown in FIG. 2 may not be the part of the CPU/DSP 170 of FIG. 1 and may be independent configuring elements. Referring to FIG. 2, the image processing apparatus 200a includes a face detecting unit 210, a composition determining unit 220, a composition selecting unit 230, and an image generating unit 240.

The face detecting unit 210 detects a face from a first image. The first image may be an image that is captured by the digital image-capturing apparatus 100 and then is input to the CPU/DSP 170. Alternatively, the first image may be an image that is stored in a predetermined storage unit, e.g., the data storage unit 142. The face detecting unit 210 may be embodied by using one of various face detection algorithms. The face detection algorithm may, for example, be configured to detect a face by using position information and feature information regarding the eyes, nose, and mouth of a person.

The composition determining unit 220 determines a composition of the first image. The composition of the first image may be determined by using a position of a face, a size of a face, the number of faces, or an aspect ratio of the first image, which are detected by the face detecting unit 210. In embodiments, the composition determining unit 220 may determine a composition based on information associated with the stored image.

Figure 3A:
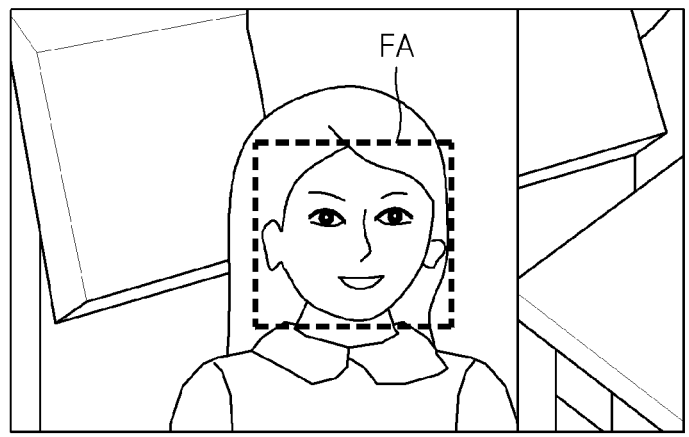
FIGS. 3A through 3C illustrate an example of an image for describing an embodiment of the invention.
Figure 3B:
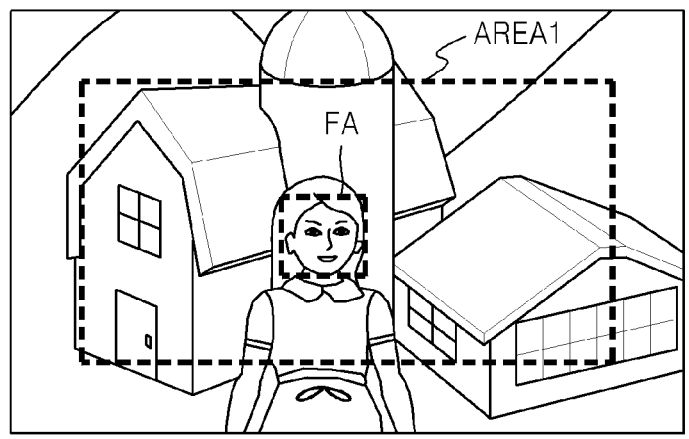
Figure 3C:
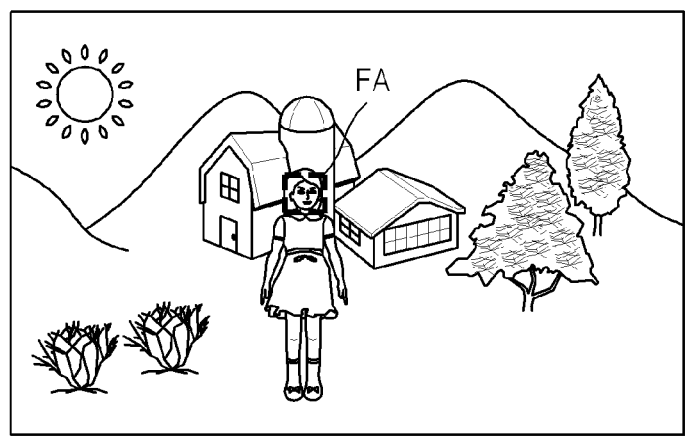

FIGS. 3A through 3C illustrate an example of an image for describing an embodiment of the invention.

In the current embodiment, according to a size of a detected face, the composition determining unit 220 may determine to which category a first image belongs, wherein the category includes a face-focused image, a face-landscape combined image, and a landscape image. As illustrated in FIG. 3A, if a size of a face area FA is equal to or greater than a predetermined reference value, the composition determining unit 220 determines that the first image is a face-focused image. As illustrated in FIG. 3B, if the size of the face area FA is within a predetermined range, the composition determining unit 220 determines that the first image is a face-landscape combined image. As illustrated in FIG. 3C, if the size of the face area FA is less than the predetermined reference value, the composition determining unit 220 determines that the first image is a landscape image.

According to the current embodiment, the composition determining unit 220 may determine a composition of the first image in consideration of both a size of a face and a position of the face. For example, the composition determining unit 220 determines that the first image is a face-focused image or a face-landscape combined image only when the face is included in a reference area AREA1. In this case, if the face is positioned in an area other than the reference area AREA1, the composition determining unit 220 may determine that the first image is a landscape image although the size of the face satisfies a requirement for a face-focused image or a face-landscape combined image.

According to the current embodiment, only if the face is detected from the first image by the face detecting unit 210, the composition determining unit 220 may determine the composition of the first image, and if the face is not detected from the first image, the composition determining unit 220 may determine that the composition of the first image does not include a face.

The composition selecting unit 230 selects a composition of a second image according to the composition of the first image determined by the composition determining unit 220. The second image includes at least one face detected from the first image and is obtained by setting a face-focused composition and then by trimming the first image. According to one or more embodiments of the invention, one or more second images may be generated. The composition selecting unit 230 may select at least one of an aspect ratio of the second image, a size of a face, the number of faces, and a position of a face according to at least one of the following from the first image, the aspect ratio, the size of the face, the number of faces, and the position of the face.

For example, the composition selecting unit 230 may select the aspect ratio of the second image to be the same as the aspect ratio of the first image. In another example, the composition selecting unit 230 may select the aspect ratio of the second image to be a predetermined aspect ratio, regardless of the aspect ratio of the first image. In embodiments, the composition selecting unit 230 provides a user interface for a user to select the composition or portions of the composition.

Also, the composition selecting unit 230 may determine the size and position of the face in the second image according to the position of the face in the first image and the composition of the first image.

For example, if the face is positioned at a center portion of the first image, the composition selecting unit 230 allows the face to be positioned at a center portion of the second image, if the face is positioned at a left portion of the first image, the composition selecting unit 230 allows the face to be positioned at a left portion of the second image, and if the face is positioned at a right portion of the first image, the composition selecting unit 230 allows the face to be positioned at a right portion of the second image. Here, in a case where the face is positioned at the left portion or the right portion of the first image, the composition selecting unit 230 may select the position of the face in the second image to allow the face to be positioned near a ⅓ point from the left portion or the right portion. By doing so, it is possible to provide a face image having an excellent composition which may reflect the intent of the user.

In another embodiment, the composition of the second image may be selected in consideration of a gaze of the face, an object around the face, or existence of another person in the first image. That is, the composition selecting unit 230 may select in which direction a margin is to be arranged according to a direction of the gaze of the face. Also, the composition selecting unit 230 may select the composition of the second image to include or exclude the object around the face or the other person.

Also, the composition selecting unit 230 may select the size and position of the face in the second image according to whether the first image is a face-focused image, a face-landscape combined image, or a landscape image. For example, if the first image is a face-focused image, the size of the face in the second image may be set as a first reference size. If the first image is a face-landscape combined image, the size of the face in the second image may be set as a second reference size that is smaller than the first reference size. If the first image is a landscape image, the size of the face in the second image may be set as a third reference size that is smaller than the second reference size.

Figure 4A:
FIGS. 4A and 4B illustrate examples of images which have various compositions as second images for describing an embodiment of the invention.
Figure 4A:
Figure 4A:
Figure 4B:
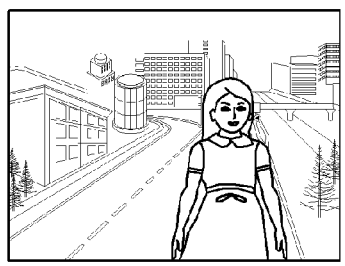
Figure 4B:
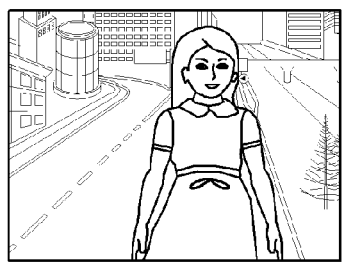
Figure 4B:

FIGS. 4A and 4B illustrate examples of images which have various compositions as second images for describing an embodiment of the invention. According to the current embodiment, a plurality of the second images having various compositions may be generated according to the composition of the first image. If the first image is a face-focused image IMG 101, a plurality of second images IMG 211 and IMG 212 that have various compositions and in which a size of a face is set as the first reference size can be generated. If the first image is a face-landscape combined image IMG 102, a plurality of second images having various compositions and including a second image IMG 221 in which a size of a face is set as the first reference size, and a second image IMG 222 in which a size of a face is set as the second reference size can be generated. If the first image is a landscape image, a plurality of second images having various compositions and including a second image in which a size of a face is set as the first reference size and another second image in which a size of a face is set as the third reference size can be generated.

The image generating unit 240 generates the second image according to the composition of the second image selected by the composition selecting unit 230. The second image including a face may be generated by trimming the first image, wherein the face is detected by the face detecting unit 210.

Figure 5:
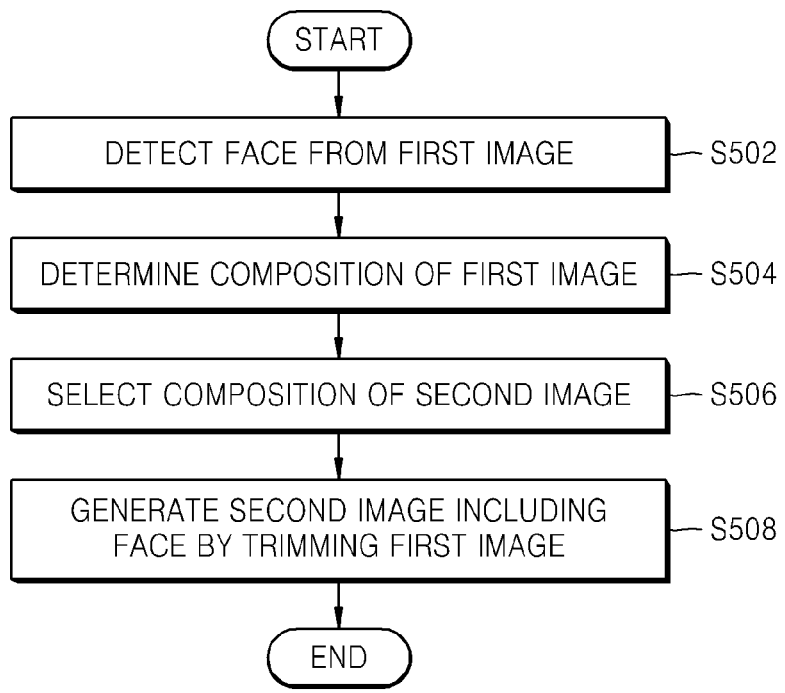
FIG. 5 is an example of a flowchart of a method of processing an image, according to an embodiment of the invention.

FIG. 5 is an example of a flowchart of a method of processing an image, according to an embodiment of the invention.

First, a face is detected from a first image (operation S502). The detection of the face may be performed by using one of various face detection algorithms.

Next, a composition of the first image is determined (operation S504). The composition of the first image may be determined by, for example, using a position of a face, a size of a face, the number of faces, or an aspect ratio of the first image. For example, the composition of the first image may be determined as a face-focused image, a face-landscape combined image, or a landscape image.

When the composition of the first image is determined, a composition of a second image is selected based on the composition of the first image (operation S506).

An aspect ratio of the second image may be selected to be the same as the aspect ratio of the first image. In another embodiment, the aspect ratio of the second image may be selected as a predetermined aspect ratio, regardless of the aspect ratio of the first image.

A position of a face in the second image may be selected according to the position of the face in the first image. In another embodiment, the position of the face in the second image may be selected according to a preset composition. In another embodiment, the composition of the second image may be selected in consideration of a gaze of the face, an object around the face, or existence of another person in the first image.

The size and position of the face in the second image may be selected according to whether the first image is a face-focused image, a face-landscape combined image, or a landscape image.

According to the current embodiment, a plurality of second images having various compositions may be generated according to the composition of the first image.

When the composition of the second image is selected (operation S506), the second image is generated according to the selected composition of the second image (operation S508). Here, the second image including the detected face may be generated by trimming the first image.

Figure 6:
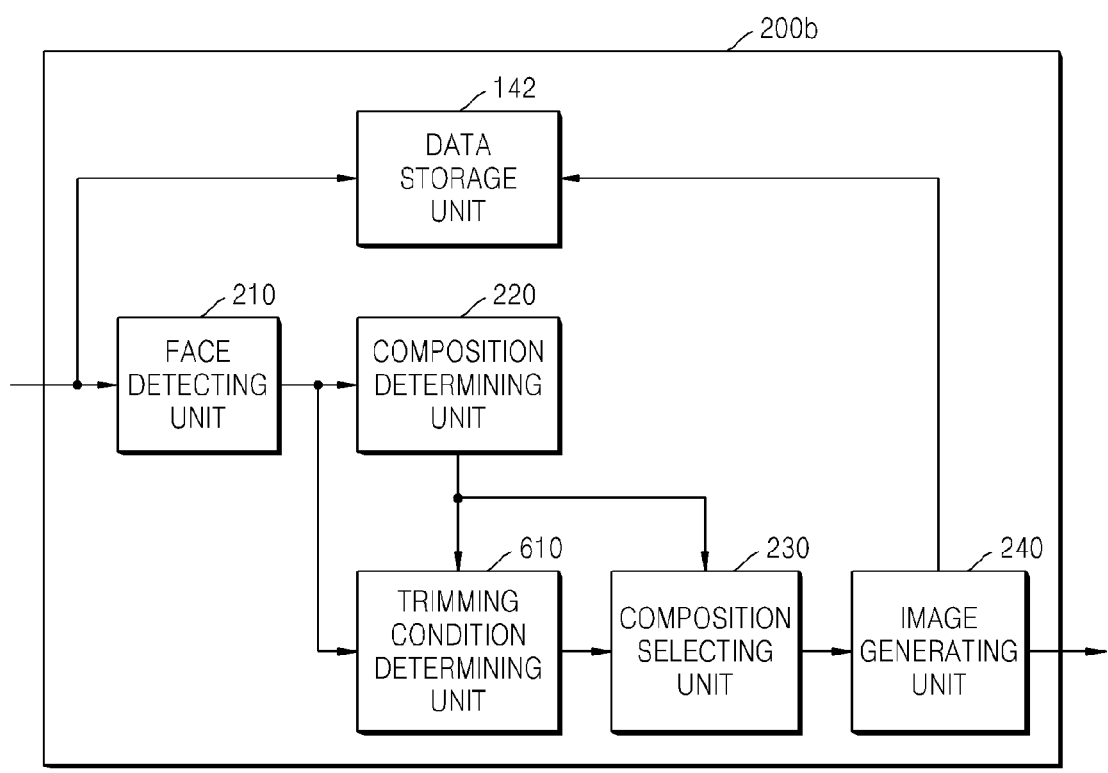
FIG. 6 illustrates an example of a structure of an image processing apparatus according to another embodiment of the invention.

FIG. 6 illustrates an example of a structure of an image processing apparatus 200b according to another embodiment of the invention. The image processing apparatus 200b includes the face detecting unit 210, the composition determining unit 220, a trimming condition determining unit 610, the composition selecting unit 230, and the image generating unit 240. In the description regarding the image processing apparatus 200b, detailed descriptions that are similar as those of the image processing apparatus 200a may be omitted.

The face detecting unit 210 detects a face from a first image.

The composition determining unit 220 determines a composition of the first image.

The trimming condition determining unit 610 determines whether the first image satisfies a trimming condition to perform a trimming operation. The composition selecting unit 230 and the image generating unit 240 may select a composition of the second image and may generate the second image only when the trimming condition determining unit 610 determines that the trimming operation can be performed.

According to the current embodiment, if a face is detected by the face detecting unit 210, the trimming condition determining unit 610 determines that the trimming operation can be performed, and if a face is not detected by the face detecting unit 210, the trimming condition determining unit 610 determines that the trimming operation cannot be performed.

According to another embodiment, if only one face is detected by the face detecting unit 210, the trimming condition determining unit 610 may determine that the trimming operation can be performed, and if a face is not detected or if two or more faces are detected, the trimming condition determining unit 610 may determine that the trimming operation cannot be performed.

According to another embodiment, if a size of a face is not included in a predetermined range, the trimming condition determining unit 610 may determine that the trimming operation cannot be performed. If the size of the face is too large, a portion of a landscape is too small so that a second image having a new composition cannot be generated, and if the size of the face is too small, when an image is enlarged, the definition of the image is decreased, which deteriorates the image quality of the second image.

The composition selecting unit 230 selects the composition of the second image according to the composition of the first image determined by the composition determining unit 220.

According to the composition of the second image selected by the composition selecting unit 230, the image generating unit 240 generates the second image including the face by trimming the first image, wherein the face is detected by the face detecting unit 210. The image generating unit 240 stores the second image as a separate image file in the data storage unit 142. Also, the first image is stored as a separate image file in the data storage unit 142.

According to the current embodiment, when the second image is stored in the data storage unit 142, the image generating unit 240 may store face-related information together with an image file of the second image. In addition, the image generating unit 240 may store an image file of the first image related to the second image, and information regarding other second images generated from the first image.

Figure 7:
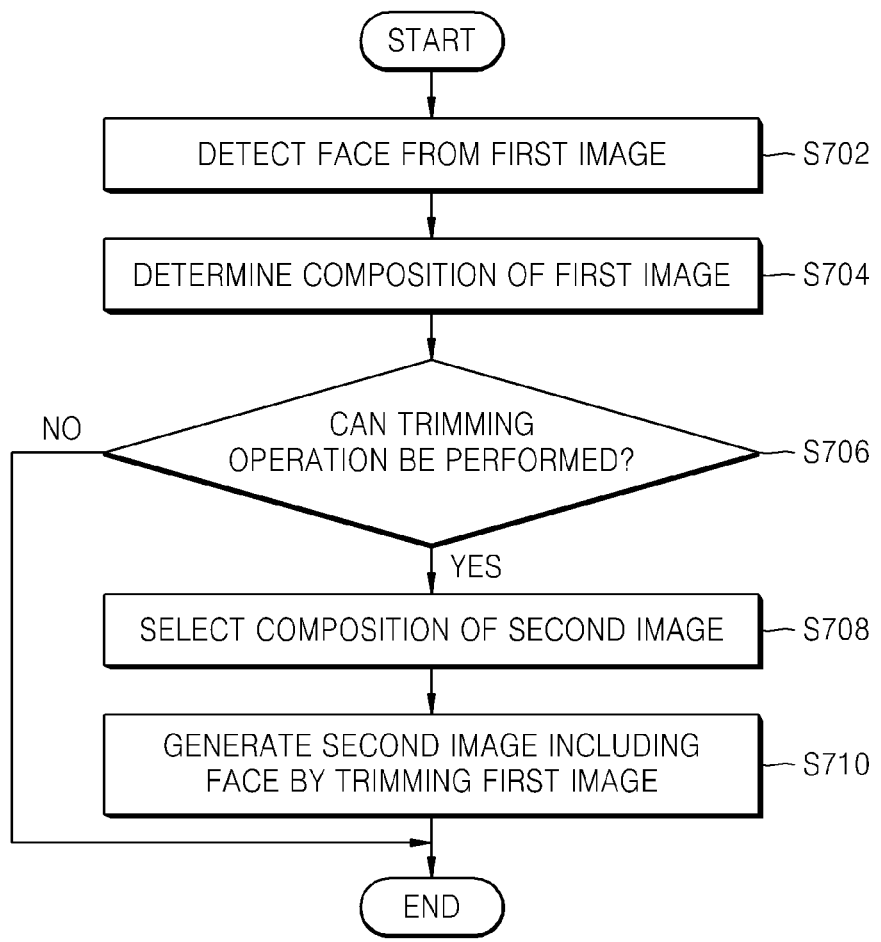
FIG. 7 is an example of a flowchart of a method of processing an image, according to another embodiment of the invention.

FIG. 7 is an example of a flowchart of a method of processing an image, according to another embodiment of the invention. First, a face is detected from a first image (operation S702).

Next, a composition of the first image is determined (operation S704). The composition of the first image may be determined by using a position of a face, a size of a face, the number of faces, or an aspect ratio of the first image.

If the face is detected (operation S702), it is determined whether the first image satisfies a trimming condition to perform a trimming operation (operation S706).

According to the current embodiment, in operation S706, if the face is detected, it is determined that the trimming operation is possible, and if the face is not detected, it is determined that the trimming operation is not possible.

According to another embodiment, in operation S706, it may be determined that the trimming operation can be performed only if one face is detected, and it may be determined that the trimming operation cannot be performed if a face is not detected or if two or more faces are detected.

According to another embodiment, in operation S706, it may be determined that the trimming operation cannot be performed if a size of the face is not included in a predetermined range.

According to the flowchart of FIG. 7, after the composition of the first image is determined (operation S704), it is determined whether the trimming operation can be performed (operation S706). However, one or more embodiments of the invention are not limited to an order of the flowchart. That is, in another embodiment, after the face is detected (operation S702), it may be determined whether the trimming operation can be performed (operation S706), and then if it is determined that the trimming operation can be performed, the composition of the first image may be determined (operation S704).

If it is determined that the trimming operation can be performed (operation S706), a composition of a second image is selected based on the composition of the first image (operation S708).

When the composition of the second image is selected (operation S708), according to the selected composition of the second image, the second image including the detected face is generated by trimming the first image (operation S710).

Figure 8:
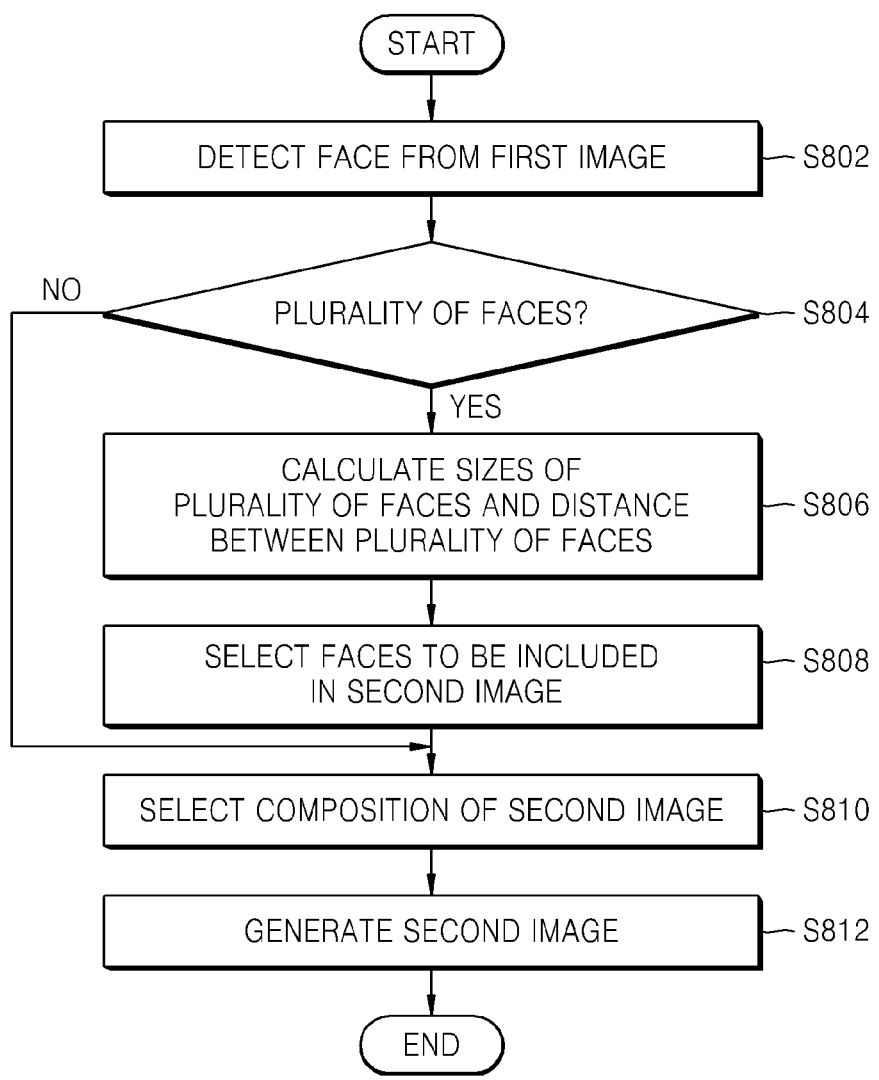
FIG. 8 is a flowchart of an example of a method of processing an image, according to another embodiment of the invention.

FIG. 8 is a flowchart of an example of a method of processing an image, according to another embodiment of the invention.

According to the current embodiment, if a plurality of faces is detected from a first image, a second image is generated by grouping the plurality of faces according to disposition of the faces in the first image, or second images are generated by separately trimming the plurality of faces. In the image processing apparatus 200*b*, if the composition determining unit 220 determines that the first image includes a plurality of faces, the composition selecting unit 230 may select a composition of the second image according to a method of selecting a composition of a plurality of faces, which is to be described below.

First, a face is detected from a first image (operation S802).

If a plurality of faces are detected from the first image (operation S804), a size of each of the faces and a distance between the faces are calculated (operation S806).

Next, at least one face to be included in a second image is selected based on the size of each of the faces and the distance between the faces included in the first image (operation S808).

FIGS. 9A through 9E are example diagrams for describing a process by which a composition of a second image is selected based on a first image having a plurality of faces, according to an embodiment of the invention.

Figure 9A:
FIGS. 9A through 9E are example diagrams for describing a process by which a composition of a second image is selected based on a first image having a plurality of faces, according to an embodiment of the invention.

According to the current embodiment, faces to be included in the second image are selected according to a distance between the plurality of faces and a size of each of the plurality of faces. FIG. 9A illustrates the first image. The first image includes four persons A, B, C, and D.

According to the current embodiment, when a distance between faces is equal to or less than a predetermined reference value, the faces are determined as a group. In FIG. 9A, the persons A, B, and C may be determined as a group, and the person D may be determined as a separate group.

According to the current embodiment, if a plurality of groups are detected, a group including faces, each having a size less than the predetermined reference value, may be excluded from the second image. In FIG. 9A, the person D forms a group, and because a size of at least one face included in the group is less than the predetermined reference value, the group may be excluded from the second image.

In addition, according to the current embodiment, a main group from among a plurality of groups may be determined and faces that are included in the plurality of groups other than the main group may be excluded from the second image. The main group may be selected according to the number of faces included in a group, sizes of faces included in a group, or a size of a largest face included in a group. In a case where the persons A, B, and C are determined as a main group, as shown in FIG. 9A, the person D may be determined as a non-target object to exclude the person D from the second image.

Figure 9B:
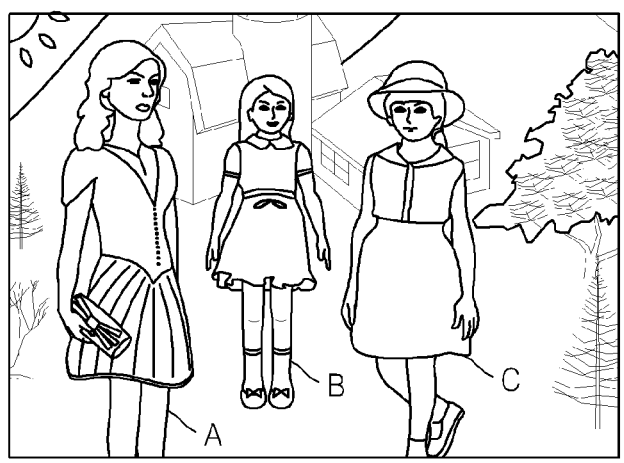

When a face to be included in the second image is selected (operation S808), the composition of the second image is selected (operation S810). With respect to the first image of FIG. 9A, if persons A, B, and C are selected to be included in the second image and person D is excluded from the second image, the composition of the second image may be selected to include the persons A, B, and C as shown in FIG. 9B. In this case, as described above, the composition of the second image may be selected according to a size of a face, a position of a face, and the number of faces in the first image, and an aspect ratio of the first image. Alternatively, the composition of the second image may be selected in consideration of the number of faces included in the second image, and the disposition between the faces of the second image.

Figure 9C:
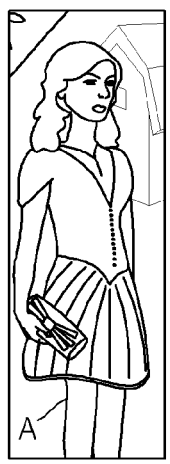
Figure 9D:
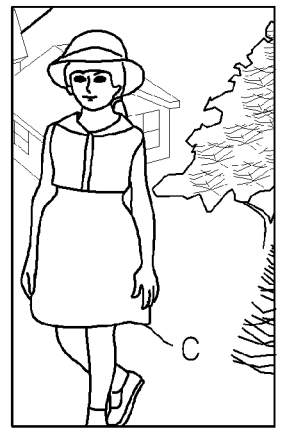
Figure 9E:
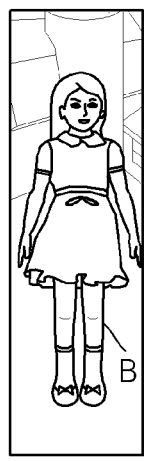

Also, as illustrated in FIGS. 9C, 9D, and 9E, the composition of the second image may be selected so that a trimming operation may be performed on each of the faces included in the second image. As illustrated in FIGS. 9D and 9E, a plurality of second images having various compositions may be generated. Also, like the person B, if a size of a face is equal to or less than the predetermined reference value, a separately-trimmed second image may not be generated with respect to the person B.

Also, in a case where the person D is selected to be included in the second image, the composition of the second image may be selected so that the trimming operation may be separately performed on the person D.

Figure 10A:
FIGS. 10A through 10C are example diagrams for describing an example process by which a composition of an example second image is selected based on a first image having a plurality of faces, according to another embodiment of the invention.
Figure 10B:
Figure 10C:
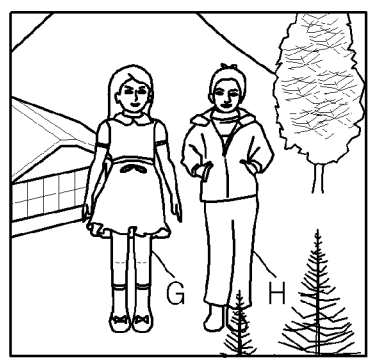

FIGS. 10A through 10O are example diagrams for describing an example process by which a composition of an example second image is selected based on a first image having a plurality of faces, according to another embodiment of the invention. FIG. 10A illustrates a first image including a plurality of persons. The first image of FIG. 10A includes four persons E, F, G, and H, of which the persons E and F are adjacent to each other and of which the persons G and H are adjacent to each other. In this case, adjacent faces are grouped according to a distance between the faces. In the first image of FIG. 10A, the persons E and F may be grouped as one group and the persons G and H may be grouped as another group. In this case, as illustrated in FIG. 10B, the composition of the second image may be selected to include the persons E and F that belong to one group, and as illustrated in FIG. 10C, the composition of the second image may be selected to include the persons G and H. However, according to the current embodiment, it is also possible that the composition of the second image is selected so that a trimming operation is performed on each of the persons E, F, G, and H.

When the composition of the second image is selected (operation S810), the second image is generated according to the selected composition of the second image (operation S812).

Figure 11:
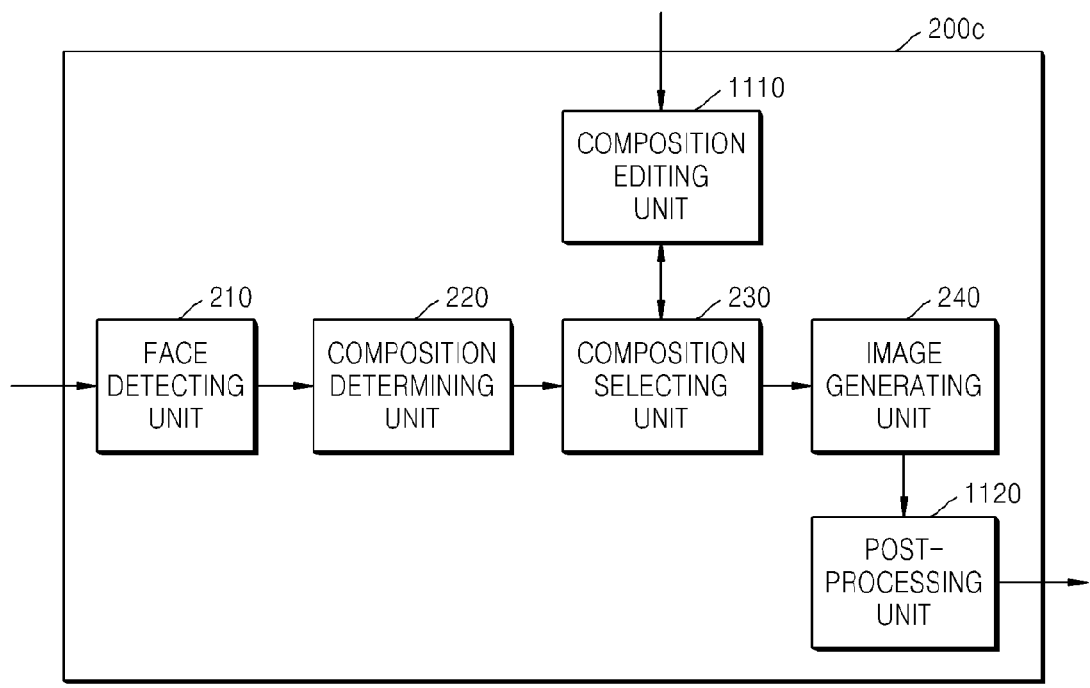
FIG. 11 illustrates an example of a structure of an image processing apparatus, according to another embodiment of the invention.

FIG. 11 illustrates an example of a structure of an image processing apparatus 200*c*, according to another embodiment of the invention.

The image processing apparatus 200*c* includes the face detecting unit 210, the composition determining unit 220, the composition selecting unit 230, a composition editing unit 1110, the image generating unit 240, and a post-processing unit 1120. In the description regarding the image processing apparatus 200*c*, detailed descriptions that are the similar as those of the image processing apparatus 200*b* of FIG. 2 may be omitted.

The face detecting unit 210 detects a face from a first image.

The composition determining unit 220 determines a composition of the first image.

The composition selecting unit 230 selects a composition of a second image according to the composition of the first image determined by the composition determining unit 220.

The composition editing unit 1110 edits the composition of the second image which is selected by the composition selecting unit 230 according to a user input. To do so, the composition editing unit 1110 may provide a user with the composition of the second image, which is selected by the composition selecting unit 230, via the display unit 164 (refer to FIG. 1) and may provide the user with a user interface by which the user may edit the composition of the second image. According to the current embodiment, a user may edit a composition recommended by the composition selecting unit 230, so that user convenience may be increased.

Figure 12:
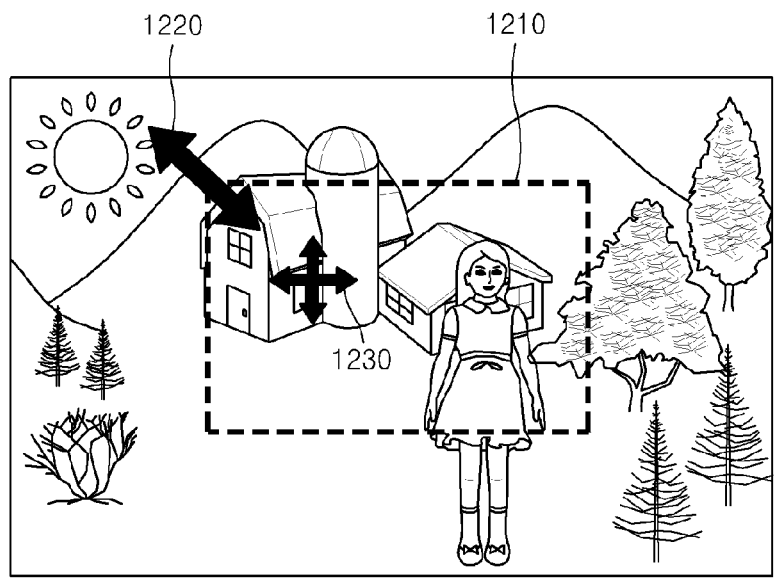
FIG. 12 illustrates an example of a screen of a user interface for a composition editing operation, according to an embodiment of the invention.

FIG. 12 illustrates an example of a screen of a user interface for a composition editing operation, according to an embodiment of the invention. According to the current embodiment, as illustrated in FIG. 12, a composition of a second image, which is selected by the composition selecting unit 230, is displayed. In this regard, a trimming line 1210 indicating an area including the second image, an area size adjustment icon 1220, and an area movement icon 1230 are provided. A user may adjust the trimming line 1210, which indicate an area including the second image, using the area size adjustment icon 1220 and the area movement icon 1230.

According to the composition of the second image which is selected by the composition selecting unit 230, the image generating unit 240 generates the second image including the face by trimming the first image, wherein the face is detected by the face detecting unit 210.

The post-processing unit 1120 performs a post-processing operation on the second image generated by the image generating unit 240. The post-processing unit 1120 may perform the post-processing operation on the second image according to the composition of the first image or the composition of the second image.

Figure 13:
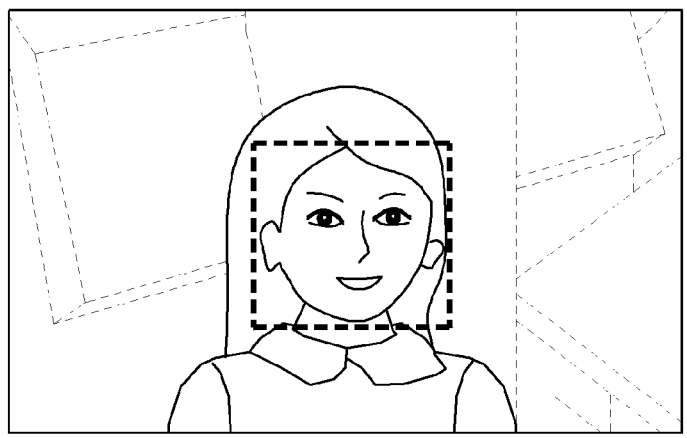
FIG. 13 illustrates an example of a post-processing operation according to an embodiment of the invention.

FIG. 13 illustrates an example of a post-processing operation according to an embodiment of the invention. For example, if a second image is a face-focused image, as illustrated in FIG. 13, the post-processing unit 1120 may increase the clearness of a person in the second image or may correct skin color or skin tone and may blur a background. If the second image is a face-landscape combined image, a person and a background in the second image may be clearly processed. If the second image is a landscape image, chroma of a landscape may be increased.

The image processing apparatus 200*a*, the image processing apparatus 200*b*, or the image processing apparatus 200*c* may further include a communication unit (not shown) for transmitting the first image or the second image to a web server via a network. According to this configuration, a user may use the first image or the second mage in a social networking service or the like, so that user convenience may be increased, According to the one or more embodiments of the invention, by providing a face-focused image that satisfies user intention, it is possible to decrease a possibility of an image-capturing failure and to provide a face-focused image having an excellent composition.

The invention can also be embodied by storing computer-readable codes in a computer-readable recording medium. The computer-readable recording medium is any data storage device that can store data which can be thereafter read by a computer system. The computer-readable recording may be non-transitory.

The computer-readable codes are configured to perform operations for embodying the method of processing an image, when the computer-readable codes are read from the computer-readable recording medium and are executed by a processor (e.g., the CPU/DSP 170). The computer-readable recording medium may be embodied by various programming languages. Also, functional programs, codes, and code segments for accomplishing the invention can be easily construed by programmers skilled in the art to which the invention pertains.

Examples of the computer-readable recording medium include read-only memory (ROM), random-access memory (RAM), CD-ROMs, magnetic tapes, floppy disks, optical data storage devices, etc. The computer-readable recording medium can also be distributed over network-coupled computer systems so that the computer-readable code is stored and executed in a distributed fashion.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. An image processing apparatus comprising:
a processor configured to:
   detect a face from a first image;
   determine whether a trimming condition is satisfied based on a position of the detected face and a size of the detected face; and
   perform a trimming operation to generate a second image comprising the detected face by trimming the first image, only if the trimming condition is satisfied;
   wherein the trimming condition is satisfied when a position of the detected face is included in a reference area comprising a center of the first image, and a size of the detected face is greater than a first reference value and smaller than a second reference value.

2. The image processing apparatus of claim 1, wherein the processor is further configured to select a composition of the second image, if the trimming condition is satisfied.

3. The image processing apparatus of claim 1, wherein the processor is further configured to adjust the clearness of a face and the clearness of a background in the second image.

4. An image processing apparatus comprising:
a memory;
a processor configured to:
detect a face from a first image;
determine whether a trimming condition is satisfied based on a position of the detected face and a size of the detected face;
if the trimming condition is satisfied,
   perform the trimming operation to generate a second image comprising the detected face by trimming the first image, and
   store the first image and the second image in the memory; and
if the trimming condition is not satisfied,
   store the first image in the memory;
wherein the trimming condition is satisfied when a position of the detected face is included in a reference area comprising a center of the first image, and a size of the detected face is greater than a first reference value and smaller than a second reference value.

\* \* \* \* \*